UNITED STATES PATENT OFFICE.

ALLEN J. RHEUBOTTOM, OF NEW ALBANY, INDIANA.

COMPOSITION OF MATTER FOR SEALING PNEUMATIC TUBES.

1,215,861.

Specification of Letters Patent. Patented Feb. 13, 1917.

No Drawing. Application filed August 14, 1916. Serial No. 114,695.

*To all whom it may concern:*

Be it known that I, ALLEN J. RHEUBOTTOM, of New Albany, in the county of Floyd and State of Indiana, have invented a certain new and useful Improvement in Composition of Matter for Sealing Pneumatic Tubes, of which the following is a full, clear, and exact description.

My invention relates to that class of pneumatic tires in which a layer of plastic material, such as raw unvulcanized rubber, is employed to act automatically in sealing punctures, and it consists in a composition of cameta, caucho ball, and accra flake which are mixed or mingled by heat (without vulcanization) and pressure, preferably in the form of sheets or strips of plastic material, suitable for use in the manufacture of air tubes for pneumatic tires, or in connection therewith.

In the manufacture of my improved composition, I prefer to use sixty (60) parts of cameta, twenty (20) parts of caucho ball, and twenty (20) parts of accra flake, which may be ground and mixed and then united into a plastic mass or sheet, without vulcanization, by moderate heat and pressure in the manner well known to those skilled in the use and manipulation of rubber.

I have found, after many and exhaustive experiments, that the foregoing composition has many advantages over and is superior to other rubber in the sealing of punctures in air-tubes for pneumatic tires.

Having thus described my invention, what I claim and desire to secure by Letters Patent is

As a new article of manufacture, a composition of matter composed of cameta, caucho ball, and accra flake, substantially as and for the purpose described.

In testimony whereof, I have hereunto set my hand.

ALLEN J. RHEUBOTTOM.

Witnesses:
JAMES K. BAKEWELL,
ANNA R. BEATTY.